United States Patent [19]

Denner, Jr. et al.

[11] 4,171,518

[45] Oct. 16, 1979

[54] APPARATUS FOR AND METHOD OF REGULATING THE OUTPUT POWER OF GASEOUS LASERS

[75] Inventors: John A. Denner, Jr., Saugus; Richard A. Allen, Lincoln, both of Mass.

[73] Assignee: Avco Corporation, Greenwich, Conn.

[21] Appl. No.: 766,024

[22] Filed: Oct. 1, 1968

[51] Int. Cl.² .............................................. H01S 3/02
[52] U.S. Cl. ..................... 331/94.5 G; 331/94.5 D; 331/94.5 M
[58] Field of Search ........................................ 331/94.5

[56] References Cited

U.S. PATENT DOCUMENTS

| | | | |
|---|---|---|---|
| 3,302,127 | 1/1967 | Lin ................................... | 331/94.5 G |
| 3,487,333 | 12/1969 | Hertberg et al. ............... | 331/94.5 G |
| 3,801,927 | 4/1974 | Allen ............................... | 331/94.5 C |

OTHER PUBLICATIONS

Hurle et al., "Electronic Population Inversions by Fluid Mechanical Techniques," 9/65, pp. 1601–1606, The Physics of Fluids, vol. 8, #9.

*Primary Examiner*—Nelson Moskowitz
*Attorney, Agent, or Firm*—Charles M. Hogan; Melvin E. Frederick

[57] ABSTRACT

There is described a method of and apparatus for regulating the output power of lasers of the type utilizing a heated high velocity flowing gas. The method and apparatus comprise a plurality of separate sources of the gas in combination with a segmented diffuser section wherein at least one but not all of the diffuser sections can be blocked to selectively permit use of all or less than all of the gas sources, thereby permitting regulation of output power by regulating the mass flow through the optically resonant cavity disposed between the sources of gas and the diffuser.

8 Claims, 1 Drawing Figure

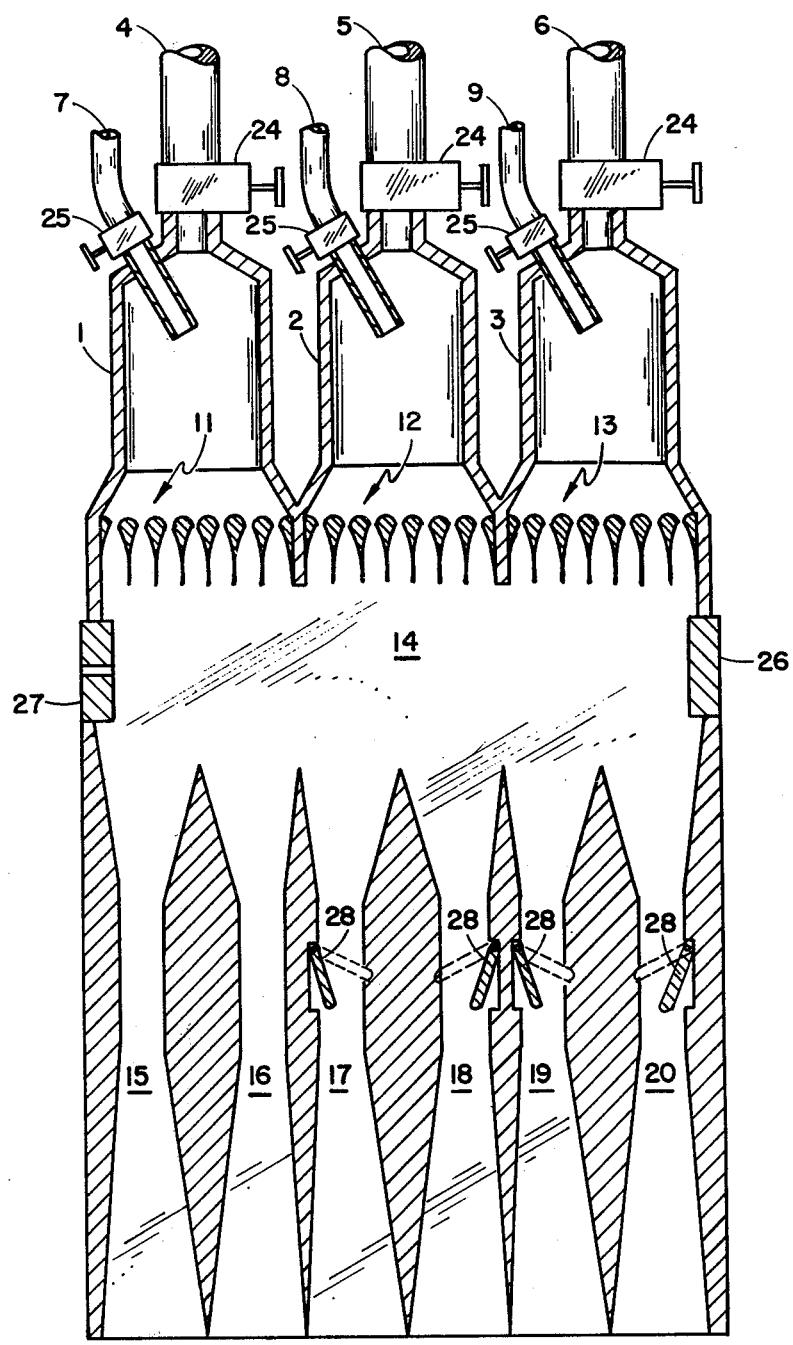

APPARATUS FOR AND METHOD OF REGULATING THE OUTPUT POWER OF GASEOUS LASERS

This invention relates to gas lasers and more particularly to controlling output power by controlling mass flow through such lasers.

Optical masers or lasers, as the art has developed, generally involve the establishment of an artificial distribution of bound electrons at energy levels other than the natural distribution in a host environment through the application of a source of energy known as the "pumping energy". This results in a greater number of molecules or atoms in some high energy level than in a lower energy level to which it is optically connected. This is known as a population inversion. The electrons present in the host environmnent in the artificial distribution then give up their energy and undergo a transition to the lower energy level. The released energy may be in the form of electromagnetic radiation; which, in the majority of devices seen thus far in the art, has been light, either in the visible or infrared.

In laser devices currently available in the art, there may be employed a gas, such as a helium-neon mixture; or a crystal, such as chromium doped aluminum oxide; or a noncrystalline solid, such as neodymium glass; or a liquid, such as trivalent neodymium in selenium oxychloride, as the environment which responds to the pumping energy, permitting the population inversion of electrons between an excited state and a lower state. The electrons in returning to the lower state give off quanta of light energy or photons in what is known in the art as a radiative transition. When the density of these photons becomes large, the radiative transition probability increases; and, in the presence of a population inversion, electromagnetic modes into which the photons are emitted, in turn, become most readily able to induce further emission therein. This is known in the art as stimulated emission of radiation and results in a narrowing of the emission line. In the currently available laser devices, electrical power is converted to pumping light, or electrical discharge or electric current, which, in turn, is used to establish the population inversion. All known prior art lasers are of relatively low power. A high power laser has been a long sought need for a large number of potential applications, both military and commercial, and numerous attempts have been made to provide a truly high power laser. The gas laser is the general category into which most of these efforts have fitted.

In the Polanyi references identified hereinafter, it is suggested that total and partial inversions may be obtained as a direct result of chemical reaction. Without flow, such inversions are transient. Even if the gas is pulsed thermally and permitted to relax differentially, such disclosed devices are inherently low density devices since the translational and rotational energy is removed by diffusion to the walls. The Hurle et al paper also identified hereinafter suggests a gas dynamic laser utilizing supersonic expansion as a method of producing population inversion between electronic states by differential radiation relaxation. However, Hurle et al admit that they were unable to observe an inversion and in any event, the size of a gas dynamic laser based solely on this principle is limited because of radiative trapping and also the stagnation temperatures required to have a significant fraction of the energy in the desired electronic level at equilibrium are quite high. For the purpose of convenience, a laser, the principle of operation of which is based on supersonic expansion as a method of producing population inversion, is referred to as a gas dynamic laser.

The following references and materials cited therein describe some of the background and physical principles involved in the gas dynamic laser under discussion and an insight, to some degree, of application of those principles in the present state of the art:

1. "Infrared and Optical Masers," by A. L. Shawlow and C. H. Townes in Physical Review, Vol. 112, No. 6 Dec. 15, 1958, pp 1940-1949.
2. "Attainment of Negative Temperatures by Heating and Cooling of a System" by N. G. Basov and A. N. Oraevskii, Soviet Physics, JETP, Vol. 17, No. 5 Nov. 1963, pp 1171-1172.
3. "Population Inversion in Adiabatic Expansion of a Gas Mixture" by V. K. Konyukhov and A. M. Prokhorov, JETP Letters, Vol. 3, No. 11, June 1, 1966, pp 286-288.
4. "Electronic Population Inversions by Fluid-Mechanical Techniques" by I. R. Hurle and A. Hertzberg, The Physics of Fluids, Vol. 8, No. 9, Sept. 1965, pp 1601-1607.
5. Polanyi, J. S., J. Chem. Phys. 34 347(1961).
6. Polanyi, J. S., Applied Optics Supplement #2 on Chemical Lasers, 109 (1965).

Broadly, operative gas dynamic lasers of the type here concerned comprise a gas containing chamber having an exhaust outlet; means for heating a polyatomic gas to provide equilibrium vibrational excitation in said gas, the polyatomic gas having an upper laser level, lower laser level and a ground state, the upper laser level having an effective relaxation time that is long compared to the effective relaxation time of the lower laser level; nozzle means for expanding the heated gas into the chamber into a stream to provide a flow time in the nozzle means that is short compared to the effective relaxation time of said upper laser level and long compared to the effective relaxation time of said lower laser level; and an optical resonator coupled to said stream of gas. For a more thorough and detailed discussion of operative gas dynamic lasers, reference is made to patent application Ser. No. 626,357, filed Feb. 16, 1967 entitled "High Powered Laser" and assigned to the same Assignee as this application.

In contrast to the present invention, variation or control of the power output of high power gas dynamic lasers of the type referred to above is extremely difficult to achieve. Thus, alternatives to the present invention are (1) the provision of different sized devices to meet specified power output levels or (2) operating a given size device at specific efficiencies less than its design efficiency to meet specified power output levels. The provision of a plurality of different sized devices with their separate supply systems and the like each time a different power level is required or a different target or target at a different range is acquired is to say the least somewhat less than desirable. Further, operation of a given device at reduced efficiency requires the same mass flow rate but with a different gas composition than for optimum conditions. Since such devices require high gas flow rates, operation in this mode results in a tremendous waste of gas.

Accordingly, it is an object of the present invention to provide an improved laser and method of operating same.

It is another object of the present invention to provide a method of and apparatus for controlling mass flow in a gaseous laser.

It is another object of the present invention to provide an improved gas flow laser and a method of operating same for providing a variable power output.

A further object of the present invention is to provide a gas laser operable at efficiencies less than optimum without excessive waste of the gaseous working fluid.

A still further object of the present invention is to provide a method of efficiently operating a gaseous laser at less than its optimum efficiency.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawing, which is a cross sectional top view of apparatus in accordance with the invention.

Directing attention now to the drawing, there is shown by way of example a combustion driven gas laser in accordance with the invention comprising a plurality (in this case 3) of combustors or burners 1, 2, and 3 to which may be supplied a suitable fuel such as cyanogen via pipes 4, 5, and 6 and a mixture of oxygen, nitrogen and hydrogen via pipes 7, 8, 9. The gases are mixed in the burners 1, 2, and 3 and burned therein to provide sources of a gaseous mixture in substantially complete equilibrium comprised of, for example, about 89 mole percent $N_2$/CO, about 10 mole percent $CO_2$, and 1 mole percent $H_2O$ at a stagnation temperature of about 1600° K. and a pressure of about 15 atmospheres. The equilibrium gaseous mixture is exhausted from each burner (which collectively function as the source of the necessary gaseous mixture) via nozzle means 11, 12, and 13. For high power operation each nozzle means is comprised of a plurality of supersonic nozzles. From each nozzle, the gas is supplied to a chamber 14 disposed immediately downstream of the nozzles as shown. The supersonic nozzle accelerate the gaseous mixture to provide in chamber 14 a velocity of, for example, about Mach 4, a pressure of about 0.1 atmospheres and a temperature of about 300°–500° C. whereby there is provided a population inversion in chamber 14. After passing through chamber 14, the gas mixture is supplied to a plurality of diffusers 15–20 and for an open cycle system is thereafter exhausted to the atmosphere. Conventional valve means 24 and 25 are provided for controlling respectively the supply of fuel and combustion supporting medium to the burners or sources of working fluid whereby the combustion of fuel in the burners provides a gaseous mixture at the required temperature and pressure to produce a population inversion in chamber 14. For operation as a generator or oscillator chamber 14 is provided with a fully reflective mirror 26 and a partially reflective mirror 27. Hole coupling is utilized to provide an operable partially reflective mirror. If the device is to function as an amplifier, then oppositely disposed windows transparent at the desired wavelength, such as at 10.6 micron wavelength, need only be substituted for the aforementioned mirrors.

The diffuser as shown may comprise a segmented diffuser. One or more sections may be disposed downstream of each burner or source of gas to at least substantially receive the gas therefrom. Two sections are shown by way of example in the drawing. The diffusers are provided with one-way valves 28 which when actuated preferably block all but one diffuser section (diffusers 15 and 16 for example) to prevent the flow of gas therethrough. The valves 28 may be actuated manually or by a solenoid separately or simultaneously with the fuel valves 24 and 25 of the sources of gas associated with each diffuser section.

The various features and advantages of the invention are thought to be clear from the foregoing description. Various other features and advantages not specifically enumerated with undoubtedly occur to those versed in the art, as likewise will many variations and modifications of the preferred embodiment illustrated, all of which may be achieved without departing from the spirit and scope of the invention as defined by the following claims:

We claim:

1. In a gas dynamic laser the combination comprising:
   (a) a plurality of controllable sources of a high temperature gas;
   (b) an optically resonant cavity;
   (c) nozzle means disposed between said sources and said cavity for separately receiving said gas from said sources and introducing said gas into said cavity;
   (d) a plurality of diffuser means for substantially separately receiving said gas from said cavity; and
   (e) means for blocking at least one but less than all of said diffuser means to prevent the flow of gas therethrough.

2. The combination as defined in claim 1 whereby said gas is introduced into said cavity at a high velocity and less than atmospheric pressure.

3. The combination as defined in claim 1 and additionally including means for controlling the supply of gas to each of said sources.

4. The combination as defined in claim 2 wherein said sources are disposed adjacent one another and said diffuser means are disposed adjacent one another, a diffuser means being disposed opposite one each of said sources to at least substantially receive the gas from said one each of said sources.

5. The combination as defined in claim 3 wherein said each of said sources has a first longitudinal axis, said longitudinal axis are coplanar; a diffuser means is disposed along each of said axis, and said optical cavity includes mirror means having a second longitudinal axis normal to and at least substantially intersecting the longitudinal axis of said cavities.

6. The combination as defined in claim 5 wherein said sources comprise burners for receiving a combustible gas and a combustion supporting medium.

7. In the method of controlling the mass flow of gas in a gaseous laser wherein a heated, high velocity gas is first passed through a nozzle into an optical cavity and then through a diffuser, the steps comprising:
   (a) supplying gas to said nozzle means from separate controllable sources;
   (b) locating separate diffuser means downstream of each said source to receive gas from each said source;
   (c) cutting off gas to at least one but not all of said sources; and
   (d) blocking each difffuser means associated with each source to which gas has been cut off to prevent gas flow through said diffuser means.

8. The method as defined in claim 7 wherein saisd gas is passed through said optical cavity at supersonic velocity and less than atmospheric pressure.

* * * * *